US007887296B2

(12) United States Patent
Suciu et al.

(10) Patent No.: US 7,887,296 B2
(45) Date of Patent: Feb. 15, 2011

(54) FAN BLADE WITH INTEGRAL DIFFUSER SECTION AND TIP TURBINE BLADE SECTION FOR A TIP TURBINE ENGINE

(75) Inventors: Gabriel L. Suciu, Glastonbury, CT (US); James W. Norris, Lebanon, CT (US); Craig A. Nordeen, Manchester, CT (US); Brian Merry, Andover, CT (US)

(73) Assignee: United Technologies Corporation, Hartford, CT (US)

(*) Notice: Subject to any disclaimer, the term of this patent is extended or adjusted under 35 U.S.C. 154(b) by 873 days.

(21) Appl. No.: 11/719,755

(22) PCT Filed: Dec. 1, 2004

(86) PCT No.: PCT/US2004/040170

§ 371 (c)(1), (2), (4) Date: May 21, 2007

(87) PCT Pub. No.: WO2006/060003

PCT Pub. Date: Jun. 8, 2006

(65) Prior Publication Data

US 2009/0148287 A1 Jun. 11, 2009

(51) Int. Cl.
*F01D 5/18* (2006.01)
*F01D 5/22* (2006.01)
*F02K 3/04* (2006.01)
*F02K 3/077* (2006.01)

(52) U.S. Cl. ....................................... 416/192; 416/189

(58) Field of Classification Search ................. 416/175, 416/189, 192, 200 R, 198 A, 228
See application file for complete search history.

(56) References Cited

U.S. PATENT DOCUMENTS

| | | | |
|---|---|---|---|
| 1,544,318 | A | 6/1925 | Hodgkinson |
| 2,221,685 | A | 11/1940 | Smith |
| 2,414,410 | A | 1/1947 | Griffith |
| 2,499,831 | A | 3/1950 | Palmatier |
| 2,548,975 | A | 4/1951 | Hawthorne |
| 2,611,241 | A | 9/1952 | Schulz |
| 2,620,554 | A | 12/1952 | Mochel et al. |
| 2,698,711 | A | 1/1955 | Newcomb |
| 2,801,789 | A | 8/1957 | Moss |
| 2,830,754 | A | 4/1958 | Stalker |
| 2,874,926 | A | 2/1959 | Gaubatz |
| 2,989,848 | A | 6/1961 | Paiement |
| 3,009,630 | A | 11/1961 | Busquet |
| 3,037,742 | A | 6/1962 | Dent et al. |
| 3,042,349 | A | 7/1962 | Pirtle et al. |

(Continued)

FOREIGN PATENT DOCUMENTS

| | | |
|---|---|---|
| DE | 767704 | 5/1953 |

(Continued)

*Primary Examiner*—Edward Look
*Assistant Examiner*—Jesse Prager
(74) *Attorney, Agent, or Firm*—Carlson Gaskey & Olds P.C.

(57) ABSTRACT

A fan-turbine rotor assembly for a tip turbine engine includes an outer periphery scalloped by a multitude of elongated openings which define an inducer receipt section to receive an inducer section and a hollow fan blade section. Each fan blade section includes a turbine section which extends from a diffuser section.

5 Claims, 10 Drawing Sheets

U.S. PATENT DOCUMENTS

| | | | | |
|---|---|---|---|---|
| 3,081,597 | A | | 3/1963 | Kosin et al. |
| 3,132,842 | A | | 5/1964 | Tharp |
| 3,204,401 | A | | 9/1965 | Serriades |
| 3,216,455 | A | | 11/1965 | Cornell et al. |
| 3,267,667 | A | | 8/1966 | Erwin |
| 3,269,120 | A | | 8/1966 | Sabatiuk |
| 3,283,509 | A | | 11/1966 | Nitsch |
| 3,286,461 | A | | 11/1966 | Johnson |
| 3,302,397 | A | | 2/1967 | Davidovic |
| 3,363,419 | A | | 1/1968 | Wilde |
| 3,404,831 | A | | 10/1968 | Campbell |
| 3,465,526 | A | | 9/1969 | Emerick |
| 3,496,725 | A | | 2/1970 | Ferri et al. |
| 3,505,819 | A | | 4/1970 | Wilde |
| 3,588,277 | A | * | 6/1971 | Howald .................... 416/96 R |
| 3,616,616 | A | | 11/1971 | Flatt |
| 3,684,857 | A | | 8/1972 | Morley et al. |
| 3,703,081 | A | | 11/1972 | Krebs et al. |
| 3,705,775 | A | | 12/1972 | Rioux |
| 3,720,060 | A | | 3/1973 | Davies et al. |
| 3,729,957 | A | | 5/1973 | Petrie et al. |
| 3,735,593 | A | | 5/1973 | Howell |
| 3,811,273 | A | | 5/1974 | Martin |
| 3,818,695 | A | | 6/1974 | Rylewski |
| 3,836,279 | A | | 9/1974 | Lee |
| 3,861,822 | A | | 1/1975 | Wanger |
| 3,932,813 | A | | 1/1976 | Gallant |
| 3,979,087 | A | | 9/1976 | Boris et al. |
| 4,005,575 | A | | 2/1977 | Scott et al. |
| 4,130,379 | A | | 12/1978 | Partington |
| 4,147,035 | A | | 4/1979 | Moore et al. |
| 4,251,185 | A | | 2/1981 | Karstensen |
| 4,251,987 | A | | 2/1981 | Adamson |
| 4,265,646 | A | | 5/1981 | Weinstein et al. |
| 4,271,674 | A | | 6/1981 | Marshall et al. |
| 4,298,090 | A | | 11/1981 | Chapman |
| 4,326,682 | A | | 4/1982 | Nightingale |
| 4,452,038 | A | | 6/1984 | Soligny |
| 4,463,553 | A | | 8/1984 | Boudigues |
| 4,561,257 | A | | 12/1985 | Kwan et al. |
| 4,563,875 | A | | 1/1986 | Howald |
| 4,631,092 | A | | 12/1986 | Ruckle et al. |
| 4,751,816 | A | | 6/1988 | Perry |
| 4,785,625 | A | | 11/1988 | Stryker et al. |
| 4,817,382 | A | | 4/1989 | Rudolph et al. |
| 4,834,614 | A | | 5/1989 | Davids et al. |
| 4,883,404 | A | | 11/1989 | Sherman |
| 4,887,424 | A | | 12/1989 | Geidel et al. |
| 4,904,160 | A | | 2/1990 | Partington |
| 4,912,927 | A | | 4/1990 | Billington |
| 4,965,994 | A | | 10/1990 | Ciokajlo et al. |
| 4,999,994 | A | | 3/1991 | Rud et al. |
| 5,010,729 | A | | 4/1991 | Adamson et al. |
| 5,012,640 | A | | 5/1991 | Mirville |
| 5,014,508 | A | | 5/1991 | Lifka |
| 5,088,742 | A | | 2/1992 | Catlow |
| 5,107,676 | A | | 4/1992 | Hadaway et al. |
| 5,157,915 | A | | 10/1992 | Bart |
| 5,182,906 | A | | 2/1993 | Gilchrist et al. |
| 5,211,540 | A | * | 5/1993 | Evans ......................... 416/190 |
| 5,224,339 | A | | 7/1993 | Hayes |
| 5,232,333 | A | | 8/1993 | Girault |
| 5,267,397 | A | | 12/1993 | Wilcox |
| 5,269,139 | A | | 12/1993 | Klees |
| 5,275,536 | A | | 1/1994 | Stephens et al. |
| 5,315,821 | A | | 5/1994 | Dunbar et al. |
| 5,328,324 | A | | 7/1994 | Dodd |
| 5,443,590 | A | | 8/1995 | Ciokajlo et al. |
| 5,466,198 | A | | 11/1995 | McKibbin et al. |
| 5,497,961 | A | | 3/1996 | Newton |
| 5,501,575 | A | | 3/1996 | Eldredge et al. |
| 5,537,814 | A | | 7/1996 | Nastuk et al. |
| 5,584,660 | A | | 12/1996 | Carter et al. |
| 5,628,621 | A | | 5/1997 | Toborg |
| 5,746,391 | A | | 5/1998 | Rodgers et al. |
| 5,769,317 | A | | 6/1998 | Sokhey et al. |
| 6,004,095 | A | | 12/1999 | Waitz et al. |
| 6,095,750 | A | | 8/2000 | Ross et al. |
| 6,102,361 | A | | 8/2000 | Riikonen |
| 6,158,207 | A | | 12/2000 | Polenick et al. |
| 6,223,616 | B1 | | 5/2001 | Sheridan |
| 6,244,539 | B1 | | 6/2001 | Liston et al. |
| 6,364,805 | B1 | | 4/2002 | Stegherr |
| 6,381,948 | B1 | | 5/2002 | Klingels |
| 6,382,915 | B1 | | 5/2002 | Aschermann et al. |
| 6,384,494 | B1 | | 5/2002 | Avidano et al. |
| 6,430,917 | B1 | | 8/2002 | Platts |
| 6,454,535 | B1 | | 9/2002 | Goshorn et al. |
| 6,471,474 | B1 | | 10/2002 | Mielke et al. |
| RE37,900 | E | | 11/2002 | Partington |
| 6,513,334 | B2 | | 2/2003 | Varney |
| 6,619,030 | B1 | | 9/2003 | Seda et al. |
| 6,851,264 | B2 | | 2/2005 | Kirtley et al. |
| 6,883,303 | B1 | | 4/2005 | Seda |
| 6,910,854 | B2 | | 6/2005 | Joslin |
| 7,021,042 | B2 | | 4/2006 | Law |
| 7,214,157 | B2 | | 5/2007 | Flamang et al. |
| 2002/0190139 | A1 | | 12/2002 | Morrison |
| 2003/0031556 | A1 | | 2/2003 | Mulcaire et al. |
| 2003/0131602 | A1 | | 7/2003 | Ingistov |
| 2003/0131607 | A1 | | 7/2003 | Daggett |
| 2003/0192304 | A1 | | 10/2003 | Paul |
| 2004/0025490 | A1 | | 2/2004 | Paul |
| 2004/0070211 | A1 | | 4/2004 | Franchet et al. |
| 2004/0189108 | A1 | | 9/2004 | Dooley |
| 2004/0219024 | A1 | | 11/2004 | Soupizon et al. |
| 2005/0008476 | A1 | | 1/2005 | Eleftheriou |
| 2005/0127905 | A1 | | 6/2005 | Proctor et al. |

FOREIGN PATENT DOCUMENTS

| | | | |
|---|---|---|---|
| DE | 765809 | | 11/1954 |
| DE | 1301634 | | 8/1969 |
| DE | 2361310 | | 6/1975 |
| DE | 3333437 | | 4/1985 |
| EP | 0661413 | | 7/1995 |
| FR | 1033849 | * | 7/1953 |
| FR | 2566835 | | 1/1986 |
| GB | 766728 | | 1/1957 |
| GB | 958842 | | 5/1964 |
| GB | 1046272 | | 10/1966 |
| GB | 1287223 | | 8/1972 |
| GB | 2026102 | | 1/1980 |
| JP | 10184305 | | 7/1998 |
| WO | 02081883 | | 10/2002 |
| WO | 2004011788 | | 2/2004 |
| WO | 2004092567 | | 10/2004 |
| WO | 2006059980 | | 6/2006 |
| WO | 2006059990 | | 6/2006 |
| WO | 2006059996 | | 6/2006 |
| WO | 2006060001 | | 6/2006 |
| WO | 2006060005 | | 6/2006 |
| WO | 2006060009 | | 6/2006 |
| WO | 2006060012 | | 6/2006 |
| WO | 2006059997 | | 11/2006 |
| WO | 2006060003 | | 3/2007 |

* cited by examiner

FAN BLADE WITH INTEGRAL DIFFUSER SECTION AND TIP TURBINE BLADE SECTION FOR A TIP TURBINE ENGINE

This invention was made with government support under Contract No.: F33657-03-C-2044. The government therefore has certain rights in this invention.

BACKGROUND OF THE INVENTION

The present invention relates to a tip turbine engine, and more particularly to a fan-turbine rotor assembly which provides a fan blade with a tip turbine segment formed thereto.

An aircraft gas turbine engine of the conventional turbofan type generally includes a forward bypass fan, a compressor, a combustor, and an aft turbine all located along a common longitudinal axis. A compressor and a turbine of the engine are interconnected by a shaft. The compressor is rotatably driven to compress air entering the combustor to a relatively high pressure. This pressurized air is then mixed with fuel in a combustor and ignited to form a high energy gas stream. The gas stream flows axially aft to rotatably drive the turbine which rotatably drives the compressor through the shaft. The gas stream is also responsible for rotating the bypass fan. In some instances, there are multiple shafts or spools. In such instances, there is a separate turbine connected to a separate corresponding compressor through each shaft. In most instances, the lowest pressure turbine will drive the bypass fan.

Although highly efficient, conventional turbofan engines operate in an axial flow relationship. The axial flow relationship results in a relatively complicated elongated engine structure of considerable longitudinal length relative to the engine diameter. This elongated shape may complicate or prevent packaging of the engine into particular applications.

A recent development in gas turbine engines is the tip turbine engine. Tip turbine engines locate an axial compressor forward of a bypass fan which includes hollow fan blades that receive airflow from the axial compressor therethrough such that the hollow fan blades operate as a centrifugal compressor. Compressed core airflow from the hollow fan blades is mixed with fuel in an annular combustor and ignited to form a high energy gas stream which drives the turbine integrated onto the tips of the hollow bypass fan blades for rotation therewith as generally disclosed in U.S. Patent Application Publication Nos.: 20030192303; 20030192304; and 20040025490.

The tip turbine engine provides a thrust to weight ratio equivalent to conventional turbofan engines of the same class within a package of significantly shorter length.

One significant rotational component of a tip turbine engine is the fan-turbine rotor assembly. The fan-turbine rotor assembly includes a multitude of components which rotate at relatively high speeds to generate bypass airflow while communicating a core airflow through each of the multitude of hollow fan blades. A large percentage of the expense associated with a tip turbine engine is the manufacture of the fan-turbine rotor assembly and the integration of the turbine blades with the fan blades.

Accordingly, it is desirable to provide an assembly arrangement for a fan-turbine rotor assembly, which is relatively inexpensive to manufacture yet provides a high degree of reliability.

SUMMARY OF THE INVENTION

The fan-turbine rotor assembly for a tip turbine engine according to the present invention includes a fan hub which has an outer periphery scalloped by a multitude of elongated openings which extend into a fan hub web. Each elongated opening defines an inducer receipt section to receive an inducer section and a blade receipt section to retain a hollow fan blade section. The blade receipt section retains each of the hollow fan blade sections adjacent each inducer section. An inner fan blade mount is located adjacent an inducer exhaust from each inducer section to engage the inducer hub with the fan hub and provide a core airflow communication path from the inducer passages within each inducer section into the core airflow passage within each fan blade section.

The inducer sections and fan blade sections are directionally mounted within the fan hub such that the forces exerted upon the fan-turbine rotor assembly during operation correspond with further locking of the inducer sections and fan blade sections into the fan hub. That is, operational forces maintain the fan-turbine rotor assembly in an assembled condition rather than operating to disassemble the components.

Each fan blade section includes an integral turbine section which extends from the integral diffuser section. The integral diffuser section and the integral turbine section are preferably cast with each fan blade section. The integral diffuser section defines a diffuser discharge separated into a multitude of diffuser exits. The integral turbine section defines a multitude of turbine blades for each fan blade section arranged as a first stage turbine section and a second stage turbine section.

By forming the turbine directly to fan blades, leakage between adjacent blade platforms is minimized which increases engine efficiency. Manufacturing and assembly is also readily facilitated.

The present invention therefore provides an assembly arrangement for a fan-turbine rotor assembly which is relatively inexpensive to manufacture yet provides a high degree of reliability.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
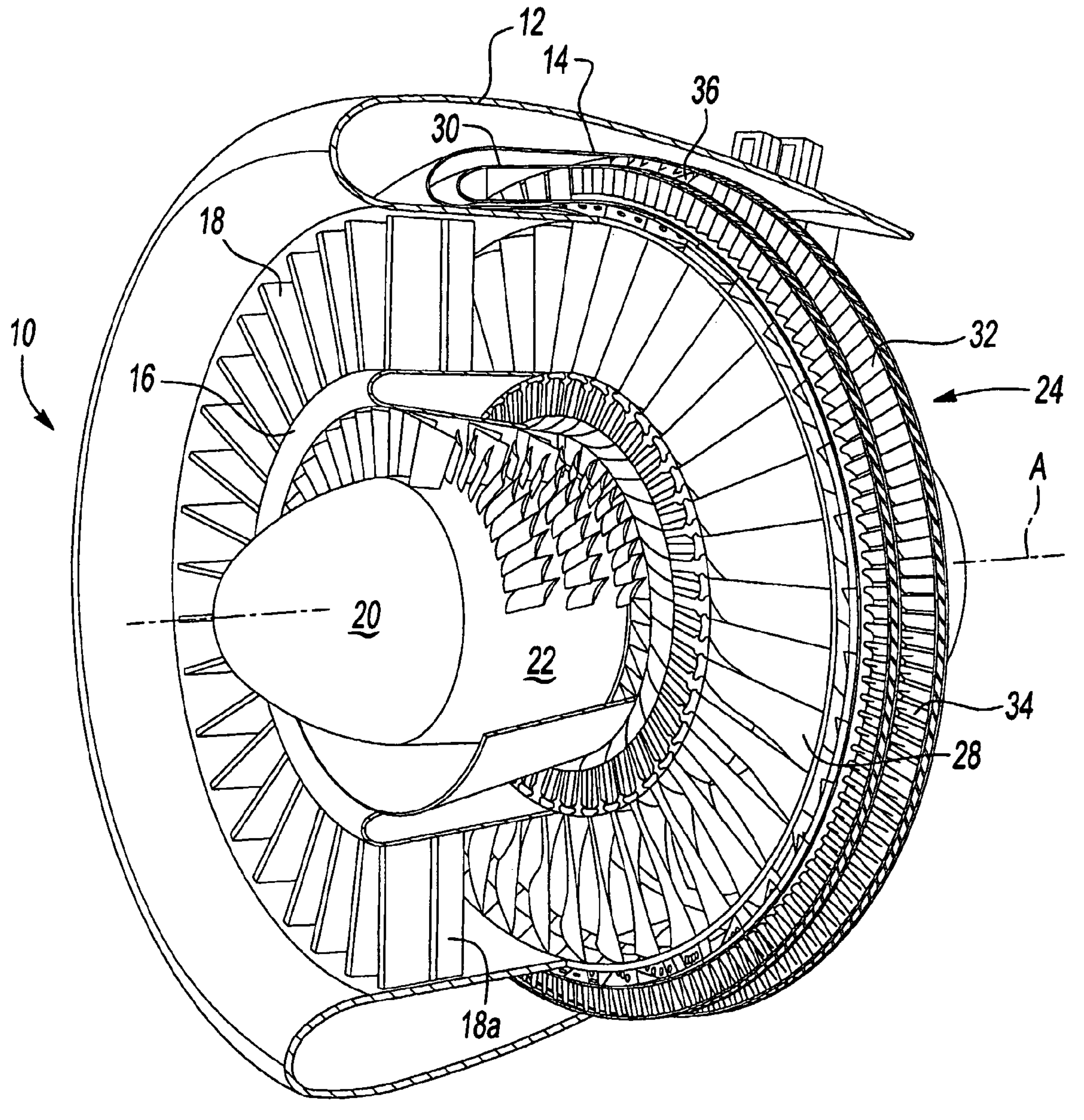
FIG. 1 is a partial sectional perspective view of a tip turbine engine.

FIG. 1 illustrates a general perspective partial sectional view of a tip turbine engine type gas turbine engine 10. The engine 10 includes an outer nacelle 12, a nonrotatable static outer support structure 14 and a nonrotatable static inner support structure 16. A multitude of fan inlet guide vanes 18 are mounted between the static outer support structure 14 and the static inner support structure 16. Each inlet guide vane preferably includes a variable trailing edge 18A.

A nose cone 20 is preferably located along the engine centerline A to direct airflow into an axial compressor 22 adjacent thereto. The axial compressor 22 is mounted about the engine centerline A behind the nose cone 20.

A fan-turbine rotor assembly 24 is mounted for rotation about the engine centerline A aft of the axial compressor 22. The fan-turbine rotor assembly 24 includes a multitude of hollow fan blades 28 to provide internal, centrifugal compression of the compressed airflow from the axial compressor 22 for distribution to an annular combustor 30 located within the nonrotatable static outer support structure 14.

A turbine 32 includes a multitude of tip turbine blades 34 (two stages shown) which rotatably drive the hollow fan blades 28 relative a multitude of tip turbine stators 36 which extend radially inwardly from the static outer support structure 14. The annular combustor 30 is axially forward of the turbine 32 and communicates with the turbine 32.

Figure 2:
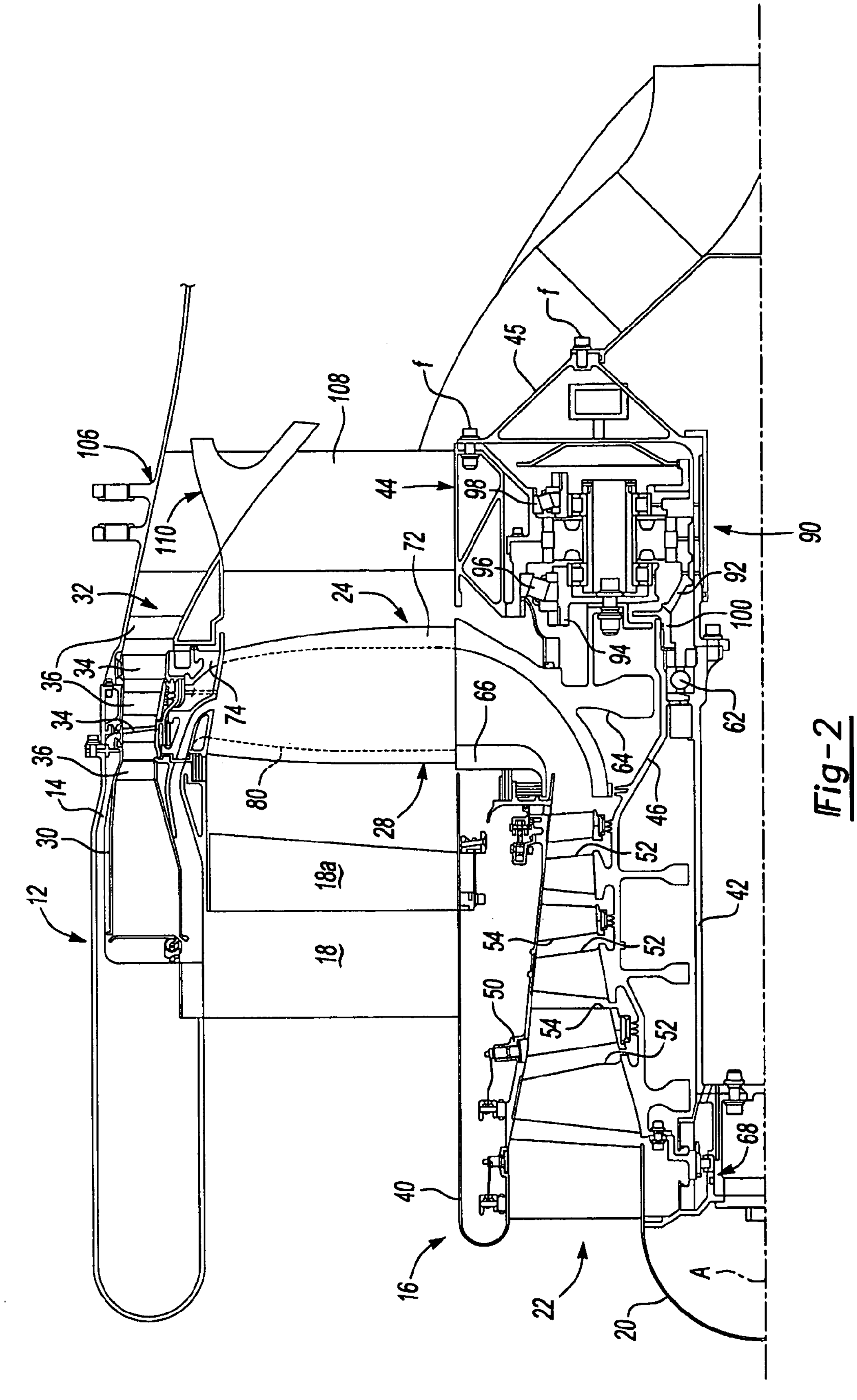
FIG. 2 is a longitudinal sectional view of a tip turbine engine along an engine centerline.

Referring to FIG. 2, the nonrotatable static inner support structure 16 includes a splitter 40, a static inner support housing 42 and an static outer support housing 44 located coaxial to said engine centerline A.

The axial compressor 22 includes the axial compressor rotor 46 from which a plurality of compressor blades 52 extend radially outwardly and a compressor case 50 fixedly mounted to the splitter 40. A plurality of compressor vanes 54 extend radially inwardly from the compressor case 50 between stages of the compressor blades 52. The compressor blades 52 and compressor vanes 54 are arranged circumferentially about the axial compressor rotor 46 in stages (three stages of compressor blades 52 and compressor vanes 54 are shown in this example). The axial compressor rotor 46 is mounted for rotation upon the static inner support housing 42 through a forward bearing assembly 68 and an aft bearing assembly 62.

The fan-turbine rotor assembly 24 includes a fan hub 64 that supports a multitude of the hollow fan blades 28. Each fan blade 28 includes an inducer section 66, a hollow fan blade section 72 and a diffuser section 74. The inducer section 66 receives airflow from the axial compressor 22 generally parallel to the engine centerline A and turns the airflow from an axial airflow direction toward a radial airflow direction. The airflow is radially communicated through a core airflow passage 80 within the fan blade section 72 where the airflow is centrifugally compressed. From the core airflow passage 80, the airflow is turned and diffused toward an axial airflow direction toward the annular combustor 30. Preferably the airflow is diffused axially forward in the engine 10, however, the airflow may alternatively be communicated in another direction.

A gearbox assembly 90 aft of the fan-turbine rotor assembly 24 provides a speed increase between the fan-turbine rotor assembly 24 and the axial compressor 22. Alternatively, the gearbox assembly 90 could provide a speed decrease between the fan-turbine rotor assembly 24 and the axial compressor rotor 46. The gearbox assembly 90 is mounted for rotation between the static inner support housing 42 and the static outer support housing 44. The gearbox assembly 90 includes a sun gear shaft 92 which rotates with the axial compressor 22 and a planet carrier 94 which rotates with the fan-turbine rotor assembly 24 to provide a speed differential therebetween. The gearbox assembly 90 is preferably a planetary gearbox that provides co-rotating or counter-rotating rotational engagement between the fan-turbine rotor assembly 24 and an axial compressor rotor 46. The gearbox assembly 90 is mounted for rotation between the sun gear shaft 92 and the static outer support housing 44 through a forward bearing 96 and a rear bearing 98. The forward bearing 96 and the rear bearing 98 are both tapered roller bearings and both handle radial loads. The forward bearing 96 handles the aft axial loads while the rear bearing 98 handles the forward axial loads. The sun gear shaft 92 is rotationally engaged with the axial compressor rotor 46 at a splined interconnection 100 or the like.

In operation, air enters the axial compressor 22, where it is compressed by the three stages of the compressor blades 52 and compressor vanes 54. The compressed air from the axial compressor 22 enters the inducer section 66 in a direction generally parallel to the engine centerline A and is turned by the inducer section 66 radially outwardly through the core airflow passage 80 of the hollow fan blades 28. The airflow is further compressed centrifugally in the hollow fan blades 28 by rotation of the hollow fan blades 28. From the core airflow passage 80, the airflow is turned and diffused axially forward in the engine 10 into the annular combustor 30. The compressed core airflow from the hollow fan blades 28 is mixed with fuel in the annular combustor 30 and ignited to form a high-energy gas stream. The high-energy gas stream is expanded over the multitude of tip turbine blades 34 mounted about the outer periphery of the fan blades 28 to drive the fan-turbine rotor assembly 24, which in turn drives the axial compressor 22 through the gearbox assembly 90. Concurrent therewith, the fan-turbine rotor assembly 24 discharges fan bypass air axially aft to merge with the core airflow from the turbine 32 in an exhaust case 106. A multitude of exit guide vanes 108 are located between the static outer support housing 44 and the nonrotatable static outer support structure 14 to guide the combined airflow out of the engine 10 to provide forward thrust. An exhaust mixer 110 mixes the airflow from the turbine blades 34 with the bypass airflow through the fan blades 28.

Figures 3, 4:
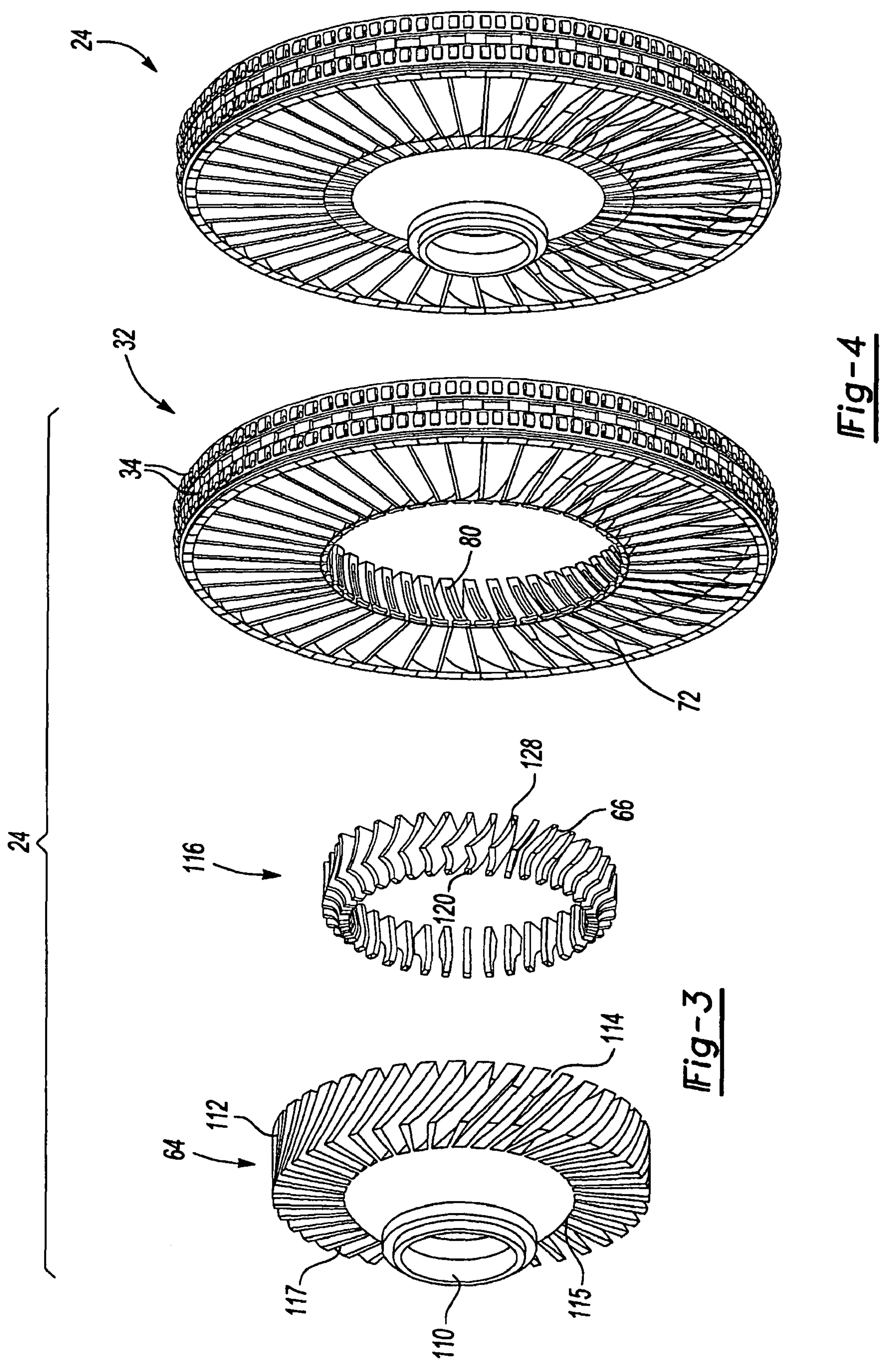
FIG. 3 is an exploded view of a fan-turbine rotor assembly.
FIG. 4 is an assembled view of a fan-turbine rotor assembly.

Referring to FIG. 3, the fan-turbine rotor assembly 24 is illustrated in an exploded view. The fan hub 64 is the primary structural support of the fan-turbine rotor assembly 24 (FIG. 4). The fan hub 64 is preferably forged and then milled to provide the desired geometry. The fan hub 64 defines a bore 110 and an outer periphery 112. The outer periphery 112 is preferably scalloped by a multitude of elongated openings 114 located about the outer periphery 112. The elongated openings 114 extend into a fan hub web 115.

Each elongated opening 114 defines an inducer receipt section 117 (also illustrated in FIG. 7A) to receive each inducer section 66. The inducer receipt section 117 generally follows the shape of the inducer section 66. That is, the inducer receipt section 117 receives the more complicated shape of the inducer section 66 without the necessity of milling the more complicated shape directly into the fan hub 64.

Figure 5:
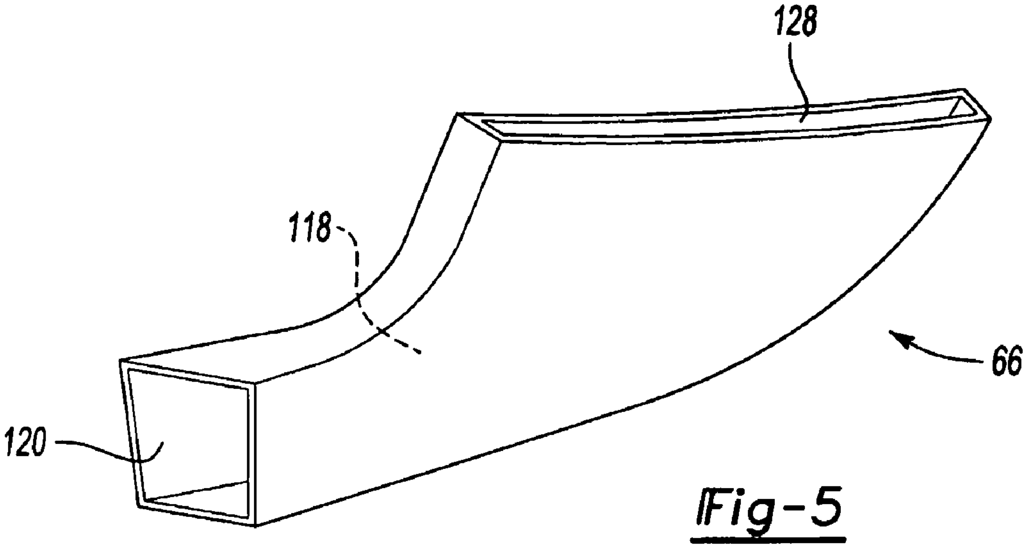
FIG. 5 is an expanded perspective view of an inducer section.

The inducer sections 66 are essentially conduits that define an inducer passage 118 between an inducer inlet 120 and an inducer exit 128 (also illustrated in FIG. 5). Preferably, the inducer sections 66 are formed of a composite material.

Figure 6:
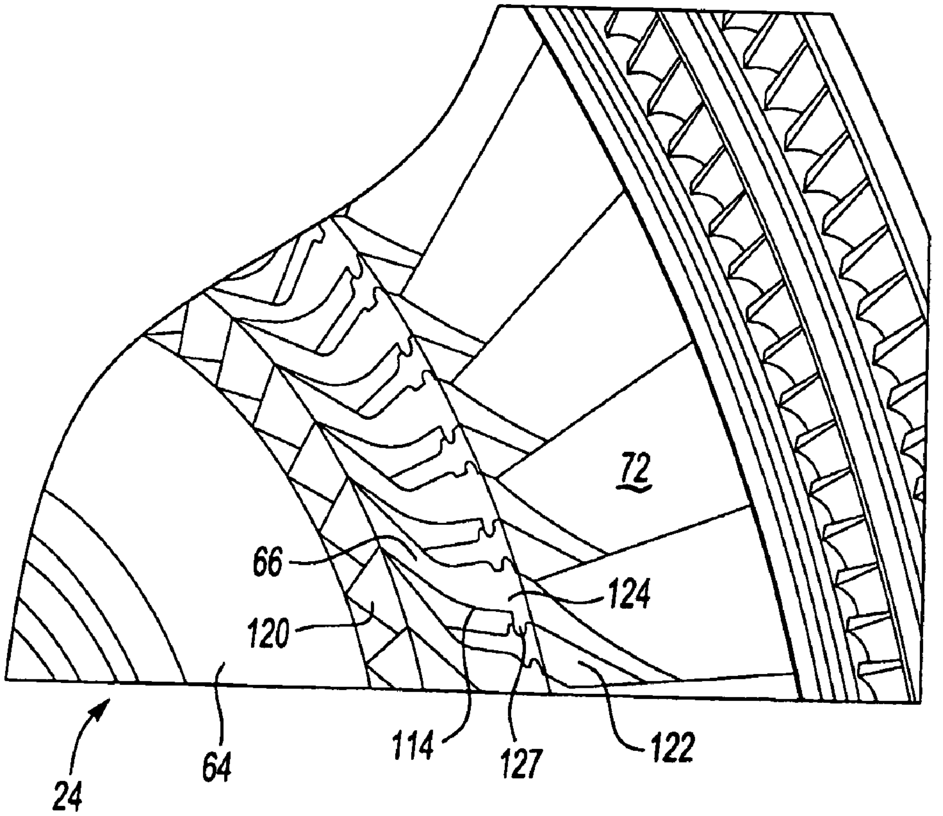
FIG. 6 is an expanded perspective view of the fan-turbine rotor assembly.

The inducer sections 66 together form an inducer 116 of the fan-turbine rotor assembly 24. The inducer inlet 120 of each inducer passage 118 extends forward of the fan hub 64 and is canted toward a rotational direction of the fan hub 64 such that inducer inlet 120 operates as an air scoop during rotation of the fan-turbine rotor assembly 24 (FIG. 6). Each inducer passage 118 provides separate airflow communication to each core airflow passage 80 (FIG. 7) when each fan blade section 72 is mounted within each elongated opening 114.

Inducer sections 66 are preferably uni-directionally assembled into the fan hub 64 such that the forces exerted upon the fan-turbine rotor assembly 24 during operation correspond with further locking of the inducer sections 66 into the fan hub 64. Each inducer inlet 120 preferably at least partially overlaps the next inducer inlet 120 when assembled into the fan hub 64 through the overlapped orientation the inducer inlets 120 lock the inducer sections 66 into the fan hub 64. That is, operational forces maintain the inducer sections 66 within the fan hub 64 in an assembled condition rather than operating to disassemble the components. Alternatively, or in addition the inducer sections 66 may be mounted to the fan hub 64 through an attachment such as bonding, welding, rivets, threaded fasteners, and the like.

Figure 7A:
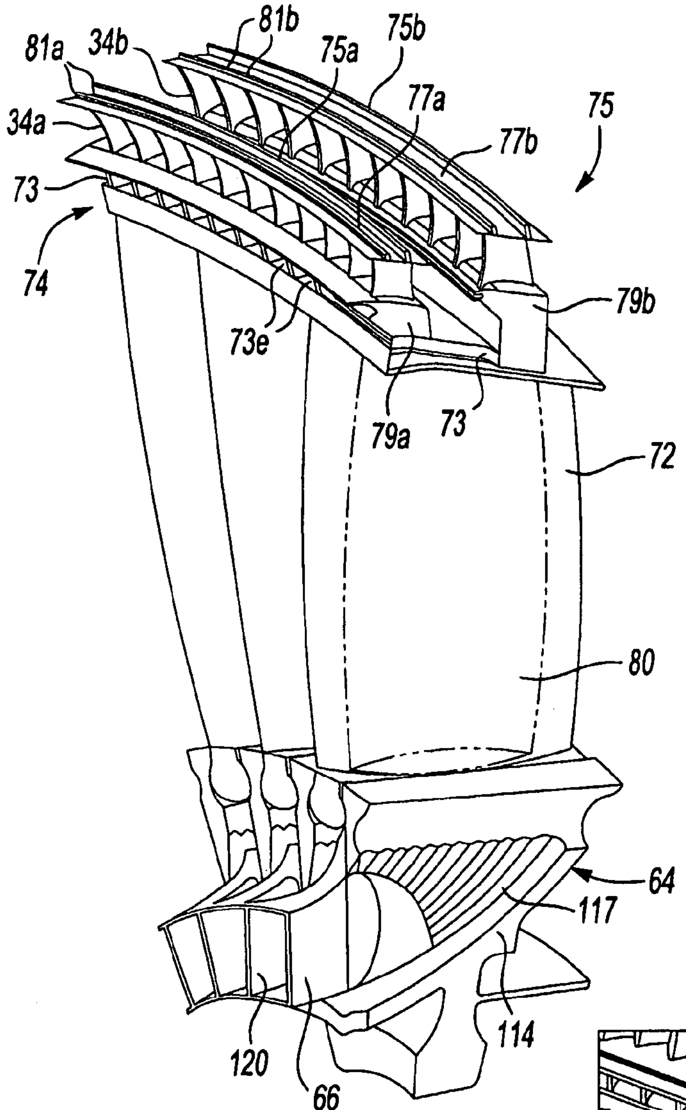
FIG. 7A is an expanded perspective view of a fan blade mounted to a hub of a fan-turbine rotor assembly.
Figure 7B:
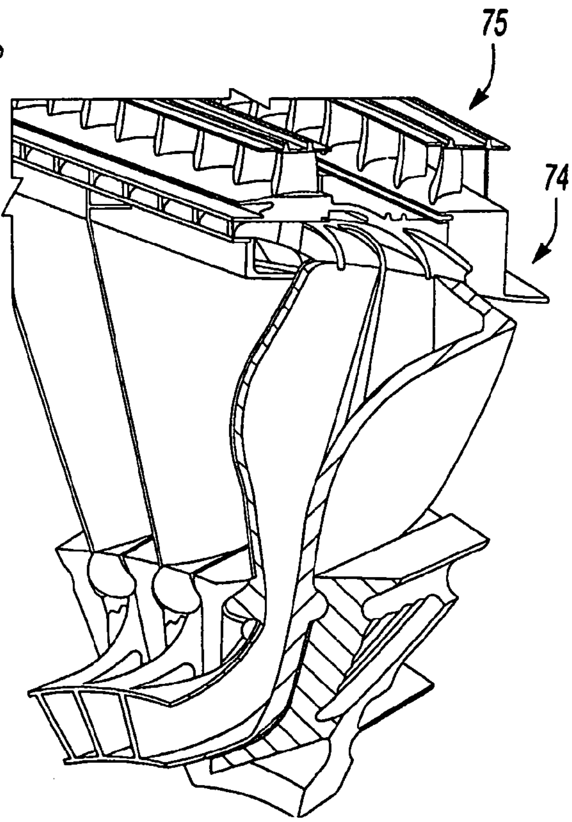
FIG. 7B is an expanded partially sectioned perspective view of a fan blade mounted to a hub of a fan-turbine rotor assembly.

Referring to FIG. 7A, each hollow fan blade section 72 preferably includes a turbine section 75 which extends from the integral diffuser section 74. The diffuser section 74 and the turbine section 75 are preferably cast as a tip portion T of each fan blade section 72. Alternatively, the tip portion T may be cast as a single component and welded to the fan blade section 72 (FIG. 7B). By forming the turbine directly to fan blades, leakage between adjacent blade platforms is minimized which increases engine efficiency. Manufacturing and assembly is also readily facilitated.

Figure 7C:
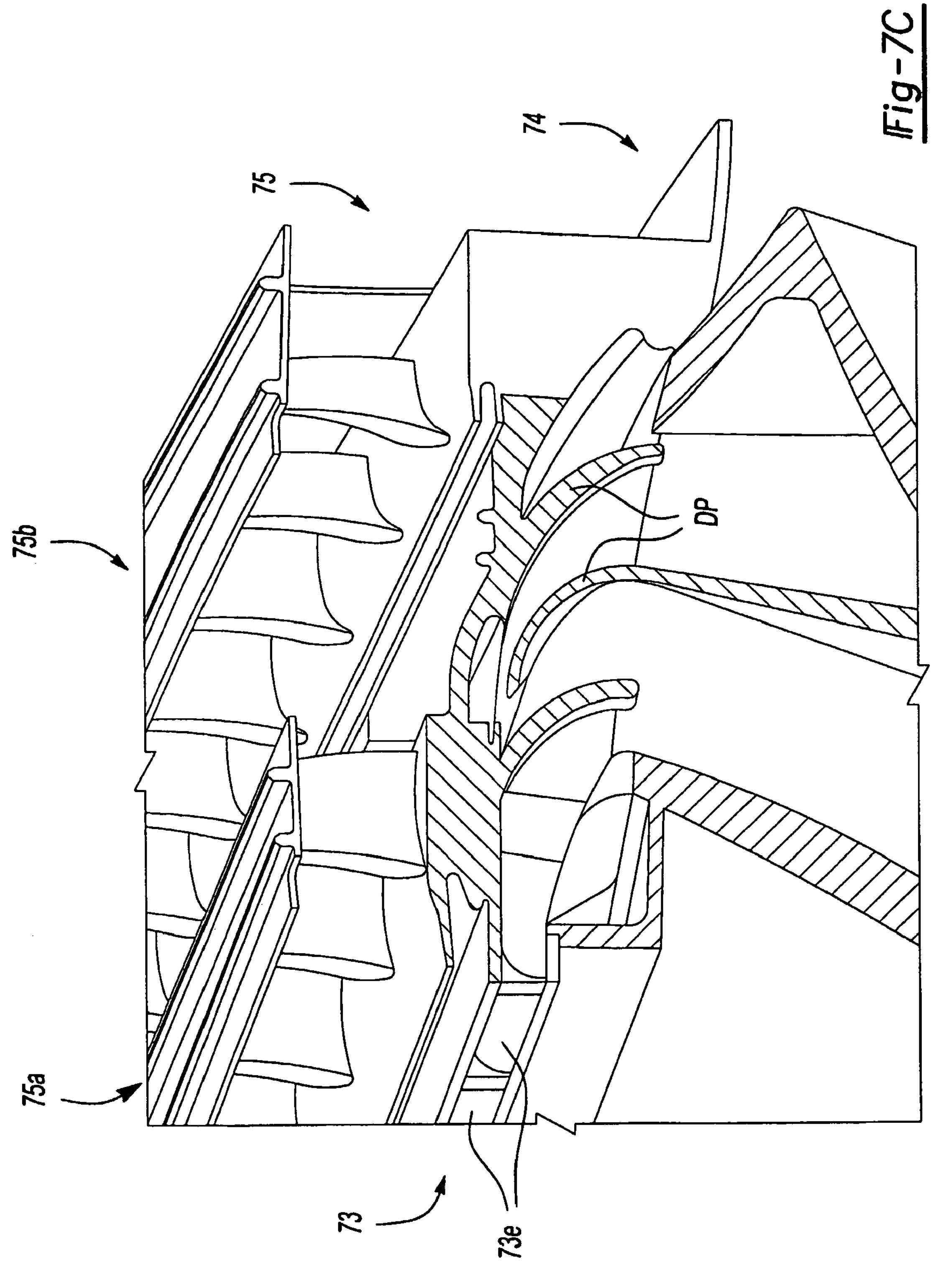
FIG. 7C is an expanded partially sectioned perspective view of a diffuser section of a fan blade.

The diffuser section 74 defines a diffuser discharge 73 separated into a multitude of diffuser exits 73*e* in communication with a multitude of diffuser airflow passages DP (FIG. 7C). That is, the diffuser passages DP diffuse and turn the radial airflow from within the core airflow passage 80 to a diffused airflow directed axially and out of the multitude of diffuser exits 73*e*.

The integral turbine section 75 defines a multitude of turbine blades 34 for each fan blade section 72. Each turbine section 75 includes a first stage turbine section 75*a* and a second stage turbine section 75*b*, however, other turbine stages will likewise benefit from the present invention.

Referring to FIG. 7C, each turbine blade section 75*a*, 75*b* includes an arcuate tip shroud 77*a*, 77*b*, an arcuate base 79*a*, 79*b* and a multitude of turbine blades 34*a*, 34*b* mounted between the arcuate tip shroud 77*a*, 77*b* and the arcuate base 79*a*, 79*b*, respectively. The arcuate tip shroud 77*a*, 77*b* and the arcuate base 79*a*, 79*b* are generally planar arcuate segments which extend from the blade section 72 defined about the engine centerline A. The arcuate tip shroud 77*a*, 77*b* and the arcuate base 79*a*, 79*b* provide support and rigidity to the multitude of respective turbine blades 34*a*, 34*b*.

The arcuate tip shroud 77*a*, 77*b* each include a tip seal 81*a*, 81*b* extending therefrom. The tip seal 81*a*, 81*b* preferably extend perpendicular to the arcuate tip shroud 77*a*, 77*b* to provide a knife edge seal between the turbine blade section 75*a*, 75*b* and the nonrotatable static outer support structure 14 (also illustrated in FIG. 8). It should be understood that other seals may alternatively or additionally be utilized.

Figure 8:
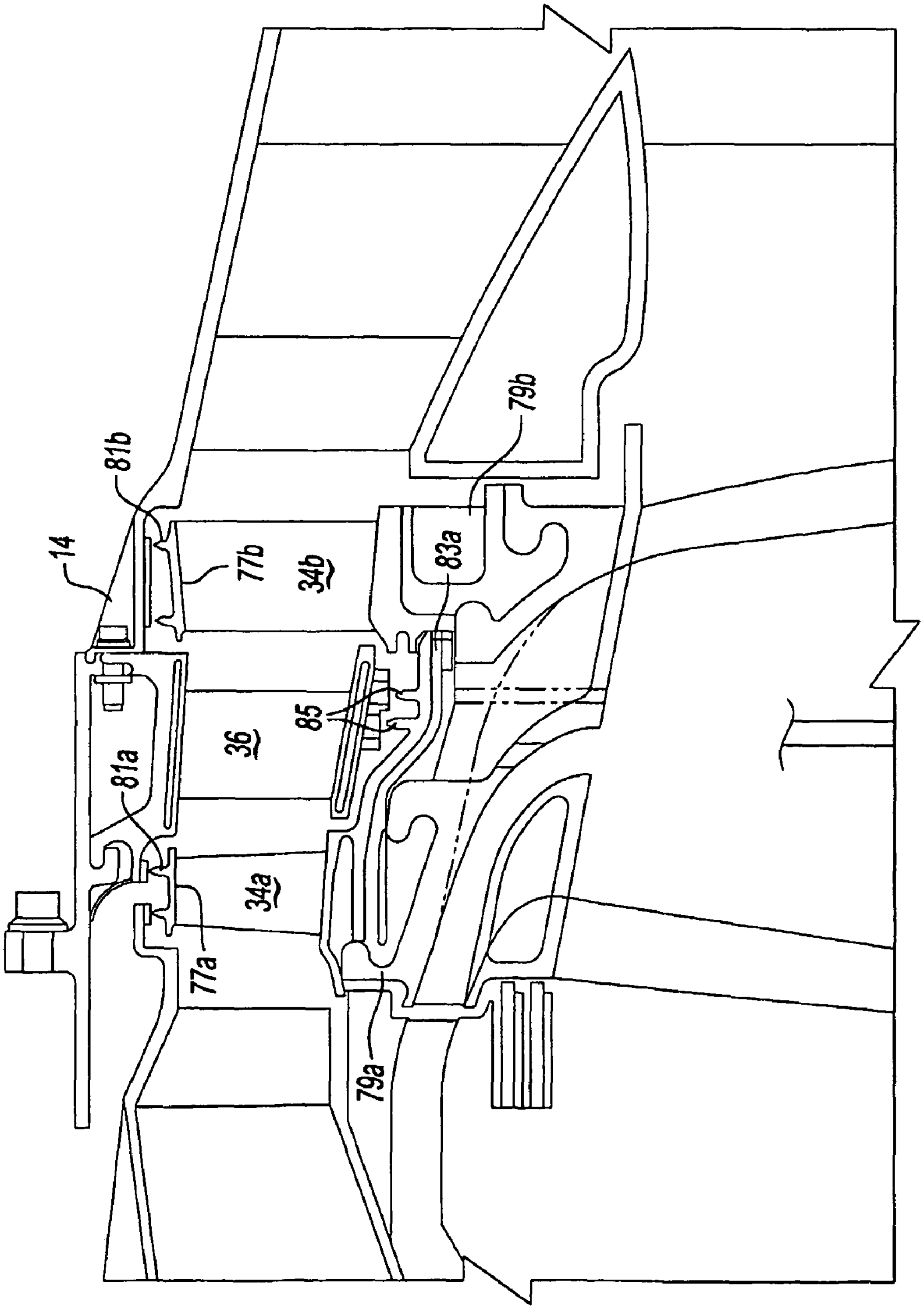
FIG. 8 is a rear sectional view of a diffuser section and turbine blade section of a fan blade.

The arcuate base 79*a*, 79*b* are formed with the integral diffuser section 74. The arcuate base 79*a*, preferably provides an extended axial stepped ledge 83*a* between the first stage turbine blades 34*a* and the second stage turbine blades 34*b*. A tip seal 85 preferably extends perpendicular to the axial stepped ledge 83*a* to provide a knife edge seal between the turbine rotor and the nonrotatable turbine stators 36 (FIG. 8). It should be understood that other seals may alternatively or additionally be utilized.

Figure 9A:
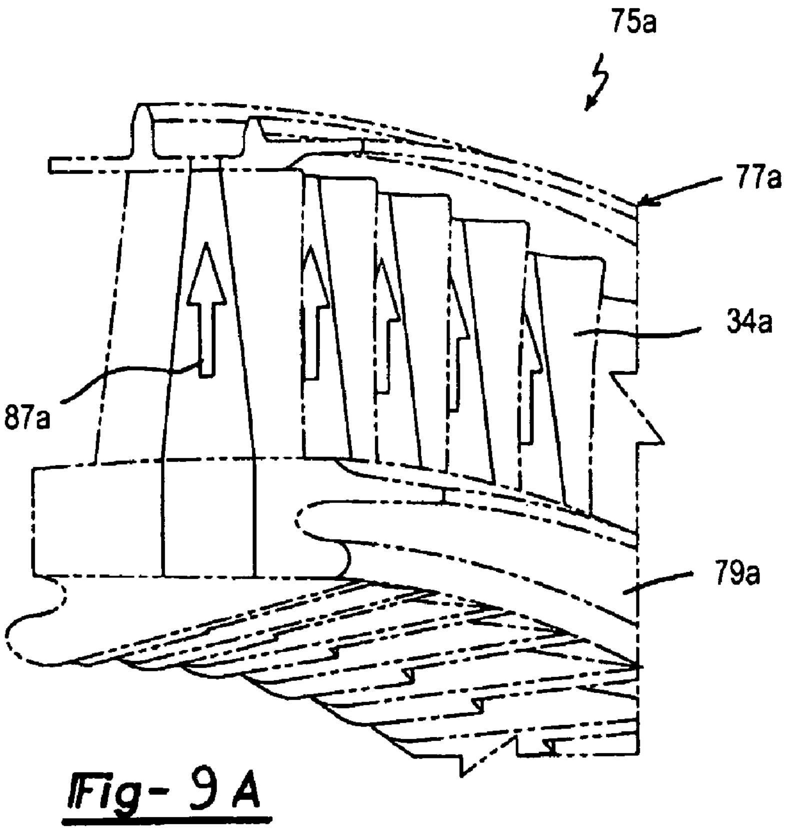
FIG. 9A is an expanded perspective view of a segment of a second stage turbine rotor ring illustrating an airflow passage through a turbine blade.
Figure 9B:
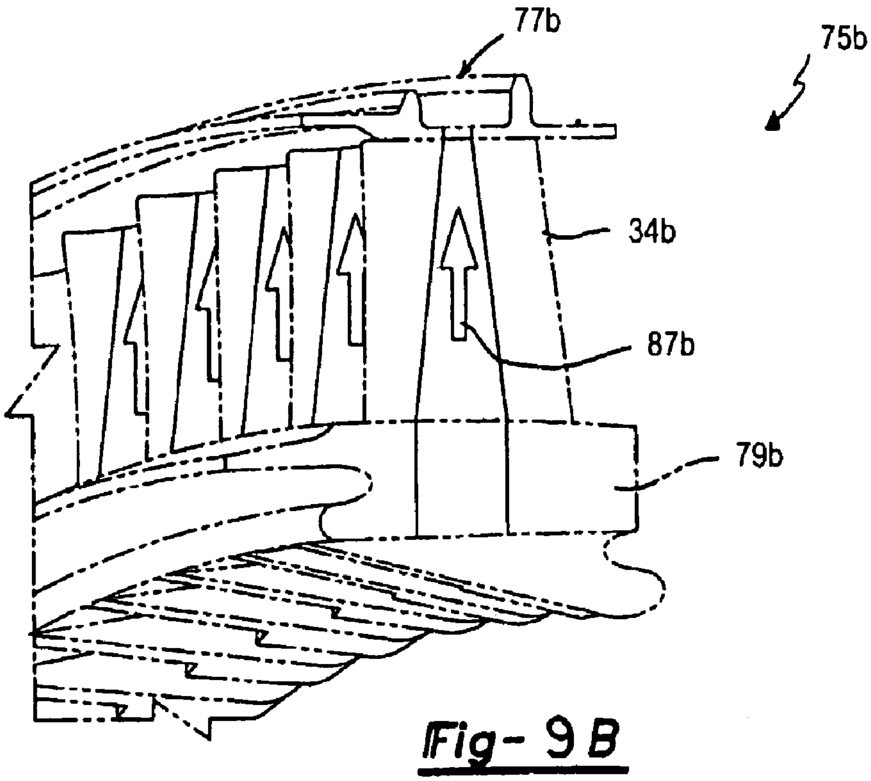
FIG. 9B is an expanded perspective view of a segment of a second stage turbine rotor ring illustrating an airflow passage through a turbine blade.
Figure 10:
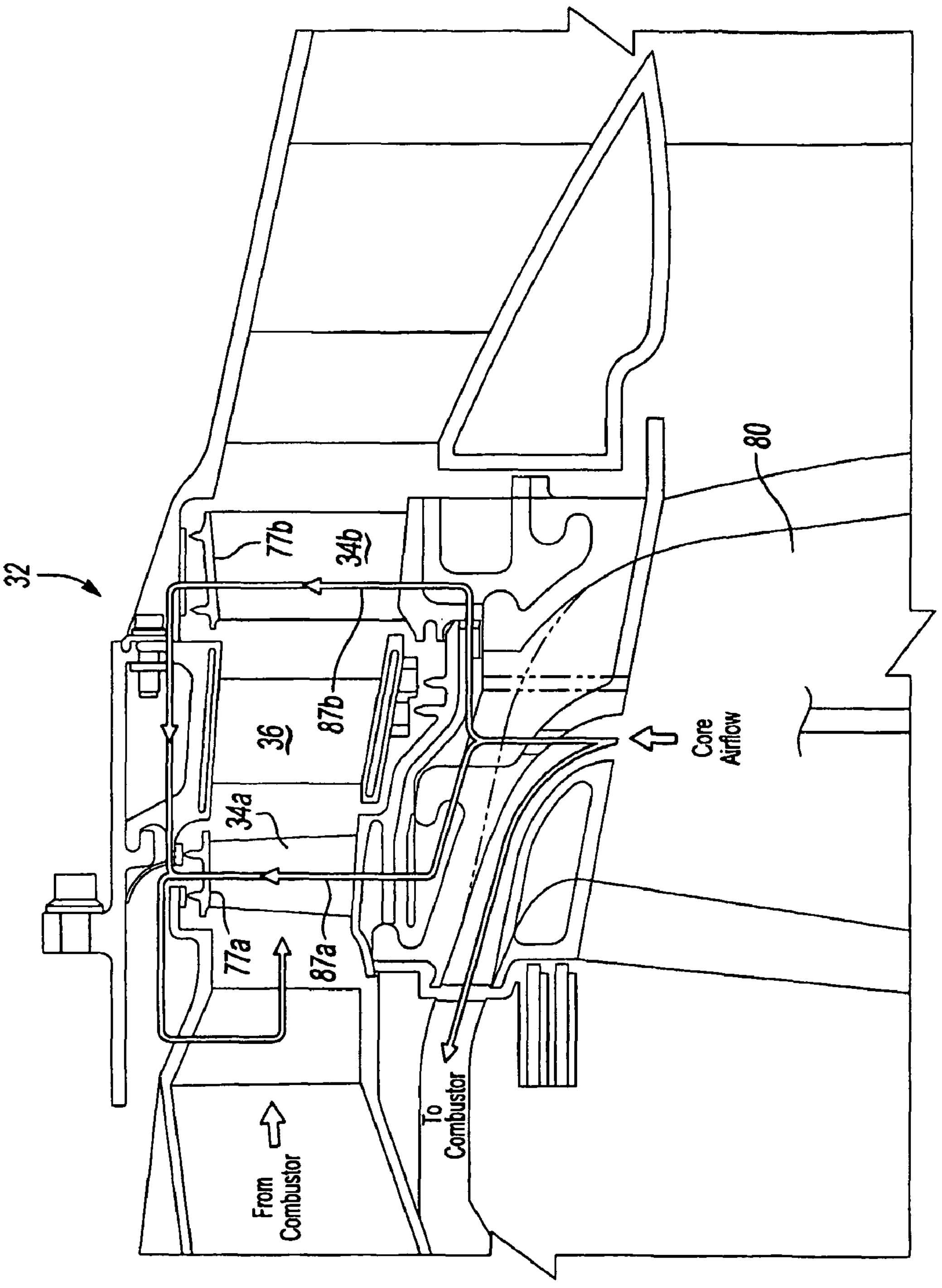
FIG. 10 is a side sectional view of a turbine for a TTE illustrating a regenerative airflow paths through the turbine.

Referring to FIGS. 9A and 9B, each of the multitude of turbine blades 34*a*, 34*b* defines a turbine blade passage (illustrated by arrows 87*a*, 87*b*) therethrough. Each of the turbine blade passages 87*a*, 87*b* extend through the arcuate tip shroud 77*a*, 77*b* and the arcuate base 79*a*, 79*b* respectively. The turbine blade passages 87*a*, 87*b* bleed air from the diffuser to provide for regenerative cooling (FIG. 10).

Figure 11:
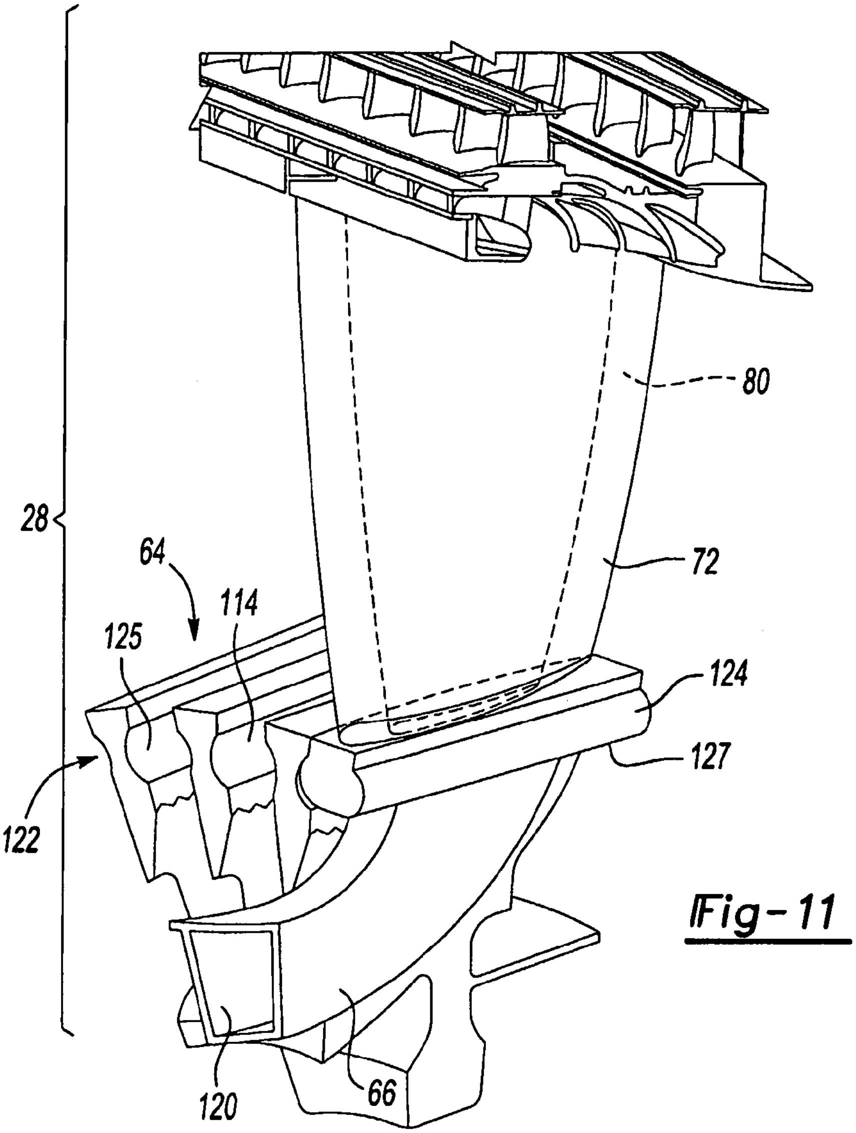
FIG. 11 is an expanded partial phantom view of a fan blade mounted to a hub of a fan-turbine rotor assembly.

Referring to FIG. 11, the fan hub 64 retains each hollow fan blade section 72 within each elongated opening 114 through a blade receipt section 122. The blade receipt section 122 preferably forms an axial semi-cylindrical opening 125 formed along the axial length of the elongated openings 114. It should be understood that other retention structures such as a dove-tail, fir-tree, or bulb-type engagement structure will likewise be usable with the present invention. Each hollow fan blade section 72 includes a fan blade mount section 124 that corresponds with the blade receipt section 122 to retain the hollow fan blade section 72 within the fan hub 64. The fan blade mount 124 preferably includes a semi-cylindrical portion 127 to radially retain the fan blade 28.

Figure 12:
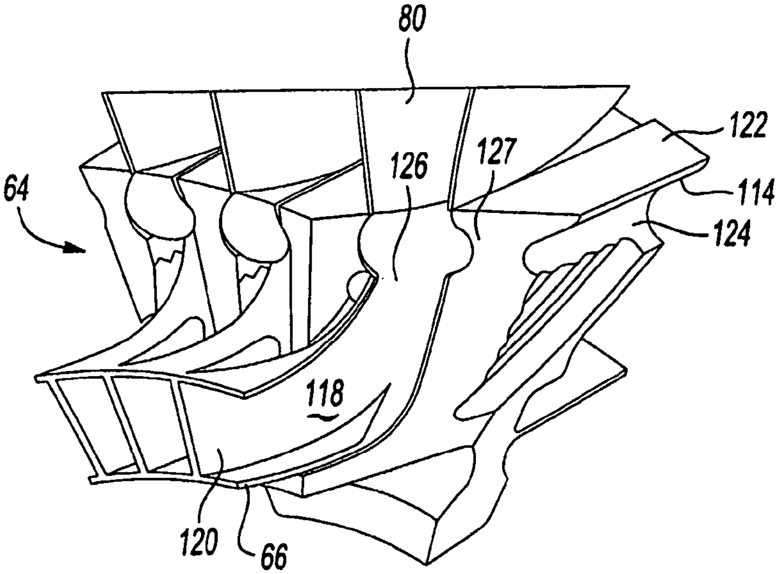
FIG. 12 is an expanded partially sectioned perspective view of an inducer section of a fan blade.

Referring to FIG. 12, the inner fan blade mount 124 is preferably uni-directionally mounted into the blade receipt section 122 such as from the rear face of the fan hub 64. The fan blade mount section 124 engages the blade receipt section 122 during operation of the fan-turbine rotor assembly 24 to provide a directional lock therebetween. That is, the inner fan blade mount 124 and the blade receipt section 122 may be frustoconical or axially non-symmetrical such that the forward segments form a smaller perimeter than the rear segment to provide a wedged engagement therebetween when assembled.

Each inducer section 66 is further retained within the fan hub 64 by interaction with the fan blade mount section 124. That is, the fan blade mount section 124 engages the inducer exit 126 (FIG. 5) to further retain the inducer sections 66 into the fan hub 64 to receive core airflow communication from the inducer passages 118 into the core airflow passage 80. Each inducer section 66 may alternatively be formed together with each hollow fan blade section 72 as a single component.

It should be understood that relative positional terms such as “forward,” “aft,” “upper,” “lower,” “above,” “below,” and the like are with reference to the normal operational attitude of the vehicle and should not be considered otherwise limiting.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

The invention claimed is:

1. A fan hub assembly for a tip turbine engine comprising:

a fan hub defining a hub axis of rotation, said fan hub defining an elongated opening located about an outer periphery of said fan hub;

a fan blade section which defines a core airflow passage therethrough;

a fan blade mount section of said fan blade section receivable within said elongated opening for retention therein;

a diffuser section of said fan blade section in communication with said core airflow passage to turn an airflow within said core airflow passage to an axial airflow direction;

a turbine blade section which extends from said diffuser section, said turbine blade section includes a multitude of turbine blades, said multitude of turbine blades comprise a first row of shrouded turbine blades and a second row of shrouded turbine blades; and an inducer receivable within said elongated opening, said inducer defining an airflow passages which turns an airflow from an axial airflow direction toward a radial airflow direction to be communicated into said core airflow passage.

2. The fan blade assembly as recited in claim 1, wherein said fan blade mount section defines a semi-cylindrical portion.

3. The fan hub assembly as recited in claim 1, further comprising a multitude of fan blades each receivable within a respective elongated opening, each of said multitude of fan blades engaged with an adjacent fan blade at a first shroud section of said first row of shrouded turbine blades and at a second shroud section of said second row of shrouded turbine blades.

4. The fan hub assembly as recited in claim 3, wherein multitude of fan blades include a multitude of first shroud sections and a multitude of said second shroud sections respectively to define a first full hoop shroud and a second full hoop shroud defined about said axis of rotation when installed within said fan hub about said outer periphery.

5. The fan hub as recited in claim 1, wherein said diffuser sections and said turbine blade section are formed as a single component.

* * * * *